April 19, 1960     F. A. McDUNNAH     2,933,092
COMB-BACK STORAGE RECEPTACLES
Filed May 29, 1958
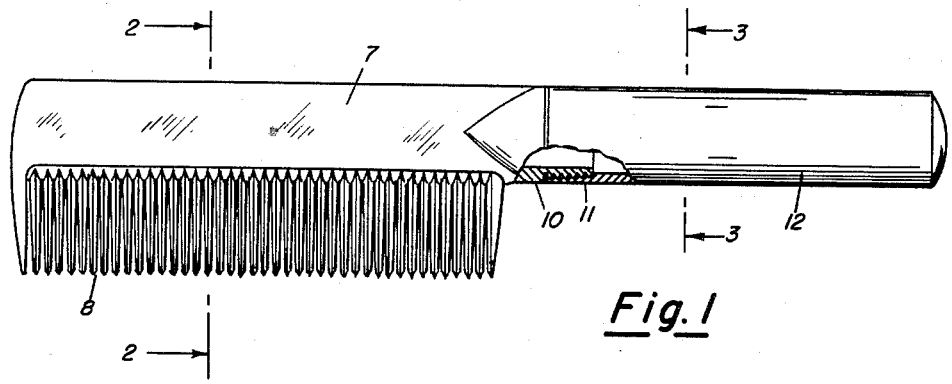
*Fig. 1*
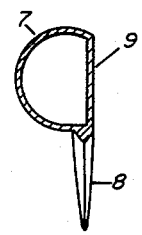     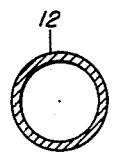
*Fig. 2*     *Fig. 3*
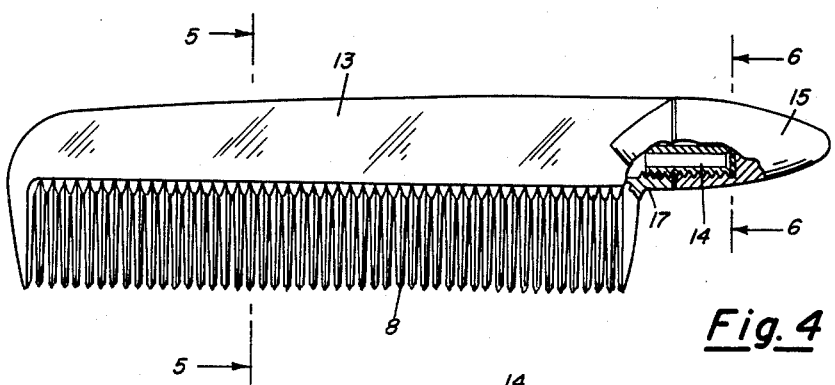
*Fig. 4*
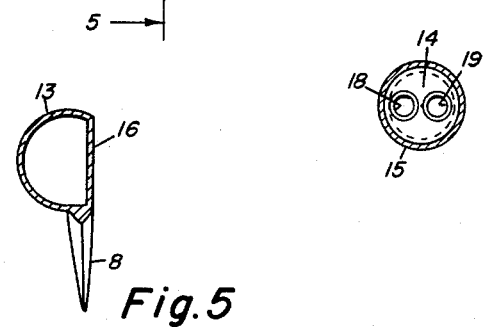     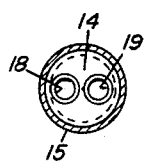
*Fig. 5*     *Fig. 6*
INVENTOR.
FREDERICH A. McDUNNAH
BY *Everett A. Curtis*
ATTORNEY 2,933,092

COMB-BACK STORAGE RECEPTACLES

Frederich A. McDunnah, National City, Calif.

Application May 29, 1958, Serial No. 738,794

1 Claim. (Cl. 132—147)

My invention relates to comb-back storage receptacles, and its objects are to provide a convenient portable means for storing and making accessible for use with combs various toiletries or preparations for making the toilet; to render said toiletries readily dispensible for both men and women as needed for grooming the hair, for facial treatments, or for other toilet necessities; to flatten the wall of the receptacle so as to allow the flattened area thereof to be co-extensive linearly or flush with the wall of the teeth of the comb and to allow the device so formed to be applied flatly to the hair and, when slidingly inclined said teeth to be drawn smoothly therethrough.

My invention further consists of other novel features of construction, and combinations and arrangements of elements and parts illustrated in the drawing and hereinafter more specifically pointed out and claimed.

Attention is hereby directed to the accompanying drawing, illustrating two preferred forms of my invention, in which drawing similar numerals of designation refer to similar parts throughout the several views, and in which:

Figure 1 is a side elevation of one of said preferred forms of my invention, as adapted for the use of women, showing a hollow storage back, and an extended handle separably affixed thereto and adapted for the storage and dispensing of toiletries;

Fig. 2 is a vertical cross-section on line 2—2 of Fig. 1, looking in the direction indicated by the arrows, and showing the flattened wall of the comb-back linearly extensive with the adjacent wall of the teeth of the comb;

Fig. 3 is a vertical cross-section on line 3—3 of the handle of the device shown in Fig. 1, looking in the direction indicated by the arrows;

Fig. 4 is a side elevation of the other preferred form of my invention as adapted for the use of men, showing a hollow storage back and a separable dispensing screw-threaded nozzle protruding therefrom, the said nozzle being normally closed by a detachable screw cap;

Fig. 5 is a vertical cross-section on line 5—5 of Fig. 4 looking in the direction indicated by the arrows, and showing the flattened wall of the comb-back linearly extensive with the adjacent wall of the teeth of the comb; and Fig. 6 is a vertical cross-section of the cap shown in Fig. 4 on line 6—6 thereof, looking in the direction indicated by the arrows.

Referring to Figs. 1, 2 and 3 of the drawing the comb-back there shown is in the form of semi-cylindrical hollow casing 7, extending substantially the entire length of the body of the comb contiguous with the teeth 8 thereof; and the inner side of said casing being flattened to form a continuous face 9 substantially in linear planar extension or flush with the adjacent face of said teeth; so that as to permit the device when used for combing the hair to lay flatly thereon, and, as inclined in accordance with the usual practice, to allow the said teeth together with the back of the comb to be drawn smoothly through the mass of said hair. As shown in Fig. 1, one end of the casing of said comb-back is extended to form the threaded nozzle 10, to which is detachably affixed the threaded end 11 of the hollow handle 12, in linear extension of the casing 7.

Within the chambers formed within the hollows of both said casing 7 and handle 12, may be stored and dispensed therefrom for use in connection with the comb, various toiletries capable of grooming or conditioning the hair. Also there may be stored within and dispensed from said chambers other toiletries, used by women, including rouge, lip-stick, face-powder, cologne, perfume, tooth-paste, and other articles of the toilet.

The handle 12, preferably shaped to conform with the palm and adjacent contour of the human hand, is of great utility in the manipulation of the device in the combing of the hair, and in the artistic arrangement thereof. Also in the application and dissemination of hair-oil and hair tonic, dispensed from the said chambers, the hair may be thoroughly renovated, groomed and conditioned; the said handle greatly facilitating said application.

In Figs. 4, 5 and 6, illustrating the other form of my invention particularly as adapted for the use of men, the body of the comb-back casing 13 is substantially the same as that of the comb-back casing 7, except that in place of the nozzle 10 and handle 12, I have substituted the special form of threaded nozzle 14, and threaded cap 15; the threaded nozzle 14 having extending therethrough the passageways 18 and 19 communicating with the hollow of the casing 13, said passageways serving as a means of pouring therefrom hair-oil, hair-tonic, or other liquid toiletries stored within said casing; and the threaded cap 15 serving as a closure for the nozzle 14. Also there may be stored within said casing 13 and dispensed therefrom other toiletries adapted for the use of men. The flattened wall 16 of the casing as shown in Fig. 6 is similar to that illustrated in Fig. 2, and is used for the same purposes as those heretofore described in connection with the other form of my device in the combing and conditioning of the hair. Preferably the inner end of the nozzle 14 is threaded to engage with the outlet mouth 17 integral with the casing 7.

My invention may be embodied in other specific forms without departing from the spirit or essential characteristics thereof. The present embodiment, as above set forth is therefore to be considered in all respects as illustrative and not restrictive, the scope of my invention being indicated by the appended claim rather than by the foregoing description, and all changes which may come within the meaning and range of equivalency of the claim are therefore intended to be embraced therein.

What I claim and desire to secure by Letters Patent is:

In a comb having a tubular storage receptacle back and a line of teeth protruding therefrom along one side thereof, one side of said tubular back being flattened coplanar with one side of said line of teeth, one end of said tubular back being closed and the opposite end rounded and internally screw threaded, a cylindrical screw threaded nozzle having one end threaded into said threaded end of the tubular back and having a pair of parallel passages extended therethrough from end to end, and a cap abutting against the open end of the tubular back having an internally screw threaded recess, said cap being threadedly fitted upon a protruding part of said nozzle with the inner end of the cap recess abutting and closing the outer ends of said passages.

References Cited in the file of this patent

UNITED STATES PATENTS

| Re. 15,808 | Simmons | Apr. 1, 1924 |
| 1,667,631 | March | Apr. 24, 1928 |
| 2,359,427 | La Mont | Oct. 3, 1944 |
| 2,595,049 | Boissoneau et al. | Apr. 29, 1952 |